June 25, 1968 A. J. MOSES 3,390,281

CONTROL APPARATUS

Filed April 22, 1965

INVENTOR.
ADRIAN J. MOSES

BY Bruce C Lutz

ATTORNEY

United States Patent Office 3,390,281

Patented June 25, 1968

3,390,281

CONTROL APPARATUS

Adrian J. Moses, Rush City, Minn., assignor to Honeywell Inc., Minneapolis, Minn., a corporation of Delaware Filed Apr. 22, 1965, Ser. No. 450,049
2 Claims. (Cl. 307—232)

ABSTRACT OF THE DISCLOSURE

An error sensor is shown wherein amplifier output signals 180° out-of-phase are summed. If the phase or amplitude of one signal varies, the sum differs from zero to provide an error signal. The error signal triggers a unijunction transistor and a bistable circuit to give an output error indication.

This invention relates generally to signal detecting apparatus and more particularly to apparatus for detecting the presence of signals of greater than a particular magnitude and duration.

The invention utilizes a unijunction transistor trigger in a bistable circuit. The input signal to the unijunction transistor trigger is derived from a charging or integrating circuit so that both the magnitude and duration of the input signal to the integrating circuit have a bearing on the signal applied to the trigger. When the signal at the trigger input exceeds permissible and predetermined limits of magnitude and duration, the trigger discharges to provide an output pulse that triggers a bistable circuit to provide an output indication of the presence of the input signal.

One specific application of an electrical circuit of this nature is to sense the outputs of an amplifier system to determine if the amplifiers are operating correctly. In this application the invention provides a simple and accurate system for determining the presence of errors in magnitude and/or phase in the amplifier outputs. The output indication of the presence of errors may be used to disable or deactivate the erroneous amplifier or alternatively to trigger control circuit to correct the gain or phase of the erroneous amplifier.

It is an object of this invention, therefore, to provide a novel bistable circuit.

It is another object of this invention to provide a bistable circuit which changes states when an input signal exceeds predetermined limits.

These and other objects of this invention will become evident to those skilled in the art upon a reading of this specification and appended claims in conjunction with the accompanying drawings of which:

Figure 1:
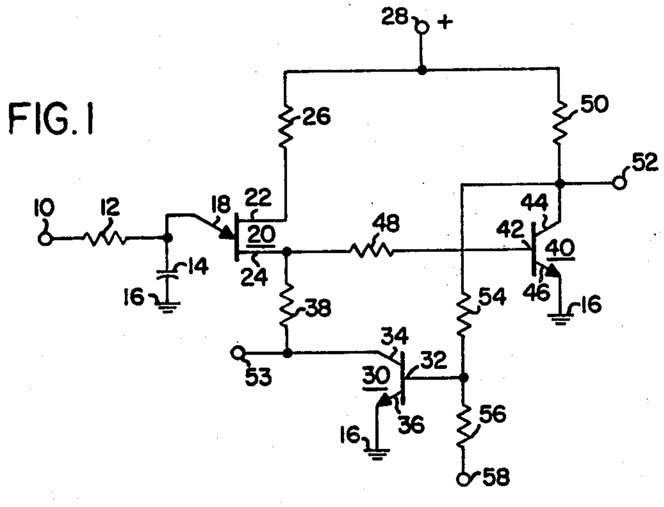
FIGURE 1 is a schematic diagram of one embodiment of this invention.

Referring now to FIGURE 1, there is shown an input means or terminal 10 connected to a resistor 12 the other end of which is connected by means of a capacitor 14 to a common conductor which is shown as ground 16. Resistor 12 and capacitor 14 may be thought of as a charging circuit, integrating circuit, or low pass filter. The junction point between resistor 12 and capacitor 14 is connected to a control means or an emitter means 18 of a unijunction transistor 20. Unijunction transistor 20 further has a first output or base means 22 and a second output or base means 24. Base means 22 is connected through a resistor 26 to a source of reference potential 28.

There is further shown a transistor 30 having a control means or base means 32, an output means or collector means 34, and a common means or emitter means 36. Emitter means 36 is connected to the common conductor

16 and collector means 34 is connected by means of resistor 38 to base means 24 of unijunction transistor 20. Collector means 34 is further connected to an output means or terminal 53.

There is further shown a transistor 40 having a control means or base means 42, an output means or collector means 44, and a common means or emitter means 46. Emitter means 46 is connected to the common conductor 16 and base means 42 is connected by means of a resistor 48 to base means 24 of unijunction transistor 20. Collector means 44 is connected through a resistor 50 to the positive potential source 28. Both collector means 44 of transistor 40 and base means 22 of unijunction transistor 20 are shown as being connected to the same potential source, however, potential source 28 does not necessarily have to be the same in both cases. Two sources could be used in place of source 28 and in some cases this would be preferable.

Collector means 44 of transistor 40 is further connected to an output means or terminal 52 and is further connected by means of resistor 54 to the base means 32 of transistor 30. Base means 32 of transistor 30 is further connected by means of a resistor 56 to an input means or terminal 58.

To understand the operation of the circuit shown in FIGURE 1 assume that a voltage is applied at terminal 10. Also assume that transistor 30 is ON or conducting and transistor 40 is OFF or nonconducting. Unijunction transistor 20 in its OFF state will permit appreciable current flow from base 22 to base 24 because the interbase resistance of a typical unijunction transistor lies in the range of about 1K ohms to 10K ohms. This leakage current will flow from source 28 through resistor 26, from base 22 to base 24 of unijunction transistor 20, through resistor 38, and from collector 34 to emitter 36 of transistor 30 to ground 16. It is easily seen that if transistor 40 is to remain nonconducting resistor 38 must be sufficiently small so that the potential of base 24 of unijunction transistor 20 does not become large enough to switch transistor 40 to its conducting state. With transistor 40 OFF collector 44 will be at a potential approximately equal to the potential of source 28. The potential of collector 44 will be coupled through resistor 54 to base 32 of transistor 30 which will hold transistor 30 in a conducting state.

The voltage applied at terminal 10 charges capacitor 14 through resistor 12. When the potential of capacitor 14 and hence of emitter 18 of unijunction transistor 20 rises to a predetermined fraction of the potential difference between base 22 and base 24, which is determined by the physical characteristics of the unijunction transistor, the unijunction transistor will conduct current from capacitor 14 through emitter 18 to base 24. The conduction of unijunction transistor 20 causes a positive pulse to appear at base 24 which is coupled through resistor 48 to base 42 of transistor 40. This positive pulse switches transistor 40 to its ON or conducting state. When transistor 40 is ON, its collector 44 will be lowered in potential. This decrease in potential of collector 44 will be coupled through resistor 54 to base 32 of transistor 30 thereby switching transistor 30 to an OFF or nonconducting state. When transistor 30 is switched OFF, the potential of collector 34 will be raised and this rise in potential is coupled through resistors 38 and 48 to base 42 of transistor 40 to hold transistor 40 in its conducting state. To reset the circuit to its original state, a pulse is applied at reset input 58 to raise the potential of base 32 and cause transistor 30 to switch ON.

As was explained hereinbefore, source 28 can be two separate sources, one of which would be a reference source connected through resistor 26 to base 22 of unijunction transistor 20, and the other would be a potential source connected through resistor 50 to collector 44 of transistor 40. The magnitude of the voltage applied to terminal 10 which will trigger unijunction transistor 20 can be controlled by varying the potential of source 28. The length of time that the voltage must be applied to terminal 10 before unijunction transistor 20 will produce an output pulse can be controlled by varying the values of resistor 12 and capacitor 14.

Figure 2:
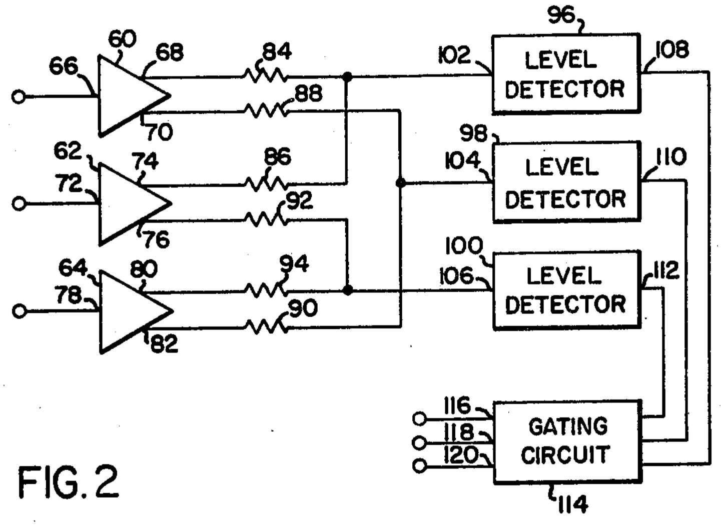
FIGURE 2 is a block diagram showing a specific use for this invention.

Referring now to FIGURE 2, there are shown three amplifiers 60, 62, and 64. Amplifier 60 has an input 66, a first output 68, and a second output 70. Amplifier 62 has an input 72, a first output 74, and a second output 76. Amplifier 64 has an input 78, a first output 80, and a second output 82. Output 68 of amplifier 60 is connected by means of a resistor 84 in series with a resistor 86 to output 74 of amplifier 62. Output 70 of amplifier 60 is connected by means of a resistor 88 in series with a resistor 90 to output 82 of amplifier 64. Output 76 of amplifier 62 is connected by means of resistor 92 in series with a resistor 94 to output 80 of amplifier 64.

There is further shown three blocks 96, 98, and 100 each labeled level detector. The circuit within each of these three blocks is identical to that of FIGURE 1. The input 102 of level detector 96 is shown as being connected to a junction point between resistors 84 and 86, the input 104 of level detector 98 is shown as being connected to the junction point between resistors 88 and 90, and the input 106 of level detector 100 is shown as being connected to the junction point between resistors 92 and 94. The outputs 108, 110, and 112 of level detectors 96, 98, and 100, respectively, are connected to a gating circuit 114. Gating circuit 114 is shown as having outputs 116, 118, and 120. However, the number of outputs taken from gating circuit 114 is not important for the purposes of this invention and can be any desired number.

To understand the operation of FIGURE 2, assume that there are input signals present at inputs 66, 72, and 78 of amplifiers 60, 62, and 64, respectively. The output signals 66, 70, 74, 76, 80, and 82 will be of various phases depending upon the construction of the amplifiers. In the particular system shown, output signals 68 and 74 are of opposite phase, therefore, when these signals are summed by resistors 84 and 86, the input signal 102 to level detector 96 will be a null signal. Output signals 70 and 82 are also of a phase opposite each other and when summed by resistors 88 and 90 a null signal will be produced at input 104 of level detector 98. Amplifier output signals 76 and 80 are also of a phase opposite each other and when summed by resistors 92 and 94 will produce a null signal at input 106 of level detector 100.

Referring again to FIGURE 1, it is seen from the explanation given in connection with FIGURE 1 that a null signal at input 10 will not produce triggering pulses from unijunction transistor 20 and outputs 52 and 53 will not change.

Now assume amplifier 60 produces an erroneous output signal. Output signals 68 and 70 will not be of a phase and magnitude opposite the phase and magnitude of output signals 74 and 82, respectively, therefore, the inputs 102 and 104 of level detectors 96 and 98 respectively will receive input signals. The magnitude of the signal that is sufficient to trigger the level detectors is controlled by the coaction of source 28, resistor 12, capacitor 14, and the summing resistors of FIGURE 2. These components establish a threshold triggering level that when exceeded, will trigger level detectors 96 and 98 producing output signals at outputs 108 and 110 of level detectors 96 and 98, respectively. These output signals can be either output 52 or 53 of FIGURE 1. These output signals are received by gating circuit 114, which can be any appropriate logic circuit to determine which of the amplifiers is in error. The outputs 116, 118, and 120 of gating circuit 114 can be used to switch amplifier 60 out of the circuit if that is desired. However, these outputs can also be used to trigger control circuitry that will tend to correct amplifier 60 and return it to a condition wherein the output signals are again correct. The outputs of the gating circuit can also be used to reset level detectors 96 and 98 by applying appropriate positive signals to input 58 of FIGURE 1.

From the explanation given in connection with amplifier 60 it can be seen that an erroneous output from amplifier 62 would trigger level detectors 96 and 100 and an erroneous output from amplifier 64 would trigger level detectors 98 and 100. Because a different pair of level detectors is triggered in each case, gating circuit 114 can be designed to distinguish the erroneous amplifier.

While three amplifiers 60, 62, and 64 have been shown, any number of amplifiers could be used with an appropriate increase in the number of level detectors. While the applicant has described certain uses for the output signals from the gating circuit 114, other uses will be obvious to those skilled in the art. It is to be understood that while I have shown and described a specific embodiment of my invention, this is for the purpose of illustration only and my invention is to be limited solely by the scope of the appended claims.

I claim as my invention:

1. Error detecting apparatus comprising, in combination:

summing means;

amplifier means having a plurality of outputs connected to said summing means with the condition that for each of said outputs there is another of said outputs of an opposite phase such that, when said pair of outputs are combined in said summing means, a signal is produced at an output from said summing means;

error detecting means comprising a triggering means and a bistable circuit means, said bistable circuit means including first and second current control means each having a conducting state and a nonconducting state and each further having output means, common means, and control means, and means interconnecting said control means and said output means of said first and second current control means, said triggering means including integrating means and unijunction transistor means connected to said integrating means to receive the integrated output of said integrating means, means connecting said integrating means to said summing means to receive said signal from said summing means, and means connecting said unijunction transistor means to said control means of said first current control means and to said output means of said second current control means whereby output triggering pulses from said unijunction transistor means switches said first current control means to said conductive state; and logic gating means connected to receive output signals from said error detecting means.

2. Apparatus of the class described comprising, in combination:

a plurality of amplifiers;

summing means connected to receive output signals from said amplifiers, said summing means operable to produce output signals indicative of errors in the outputs of said amplifiers;

a plurality of detecting means each of said detecting means comprising trigger means and bistable circuit means, said triggering means including charging circuit means and unijunction transistor means connected to said charging circuit means to receive a signal from said charging circuit means, means connecting said charging circuit means to said summing means to receive said output signals from said summing means, said triggering means being operable to produce an output signal when said output signals from said summing means exceed predetermined limits, said bistable circuit means including first and second current control means each having a conducting condition and a nonconducting condition and further having a control means and an output means, means connecting said control means of said first current control means to said unijunction transistor means to receive said output signals from said triggering means, said output signal being operable to switch said first current control means to said conducting condition, means connecting said control means of said second current control means to said output means of said first current control means whereby the conduction of said first current control means lowers the potential of said output means to switch said second current control means to said nonconducting condition, input means connected to said control means of said second current control means whereby said second current control means is switched to said conducting condition in response to signals applied to said input means, and means connecting said second current control means to said unijunction transistor means and further to said control means of said first current control means whereby the conduction of said second current control means operates to lower the potential of said control means of said first current control means to switch said first current control means to said nonconducting condition; and gating means connected to one of said output means of said first and second current control means to receive output signals from said detecting means, said gating means including logic means operable to produce output signals indicative of which of said amplifiers caused said errors.

References Cited

UNITED STATES PATENTS

| | | | |
|---|---|---|---|
| 2,923,820 | 2/1960 | Liguori et al. | 328—155 |
| 3,018,384 | 1/1962 | Zrubek | 307—88.5 |
| 3,139,539 | 6/1964 | Hewett | 307—88.5 |
| 3,164,727 | 1/1965 | Heyda | 307—88.5 |
| 3,198,961 | 8/1965 | Milsap | 307—88.5 |

ARTHUR GAUSS, *Primary Examiner.*

JOHN S. HEYMAN, *Examiner.*

H. DIXON, *Assistant Examiner.*